Nov. 18, 1924.   1,516,033
V. J. WILLEY
SCALE
Filed Feb. 6, 1923
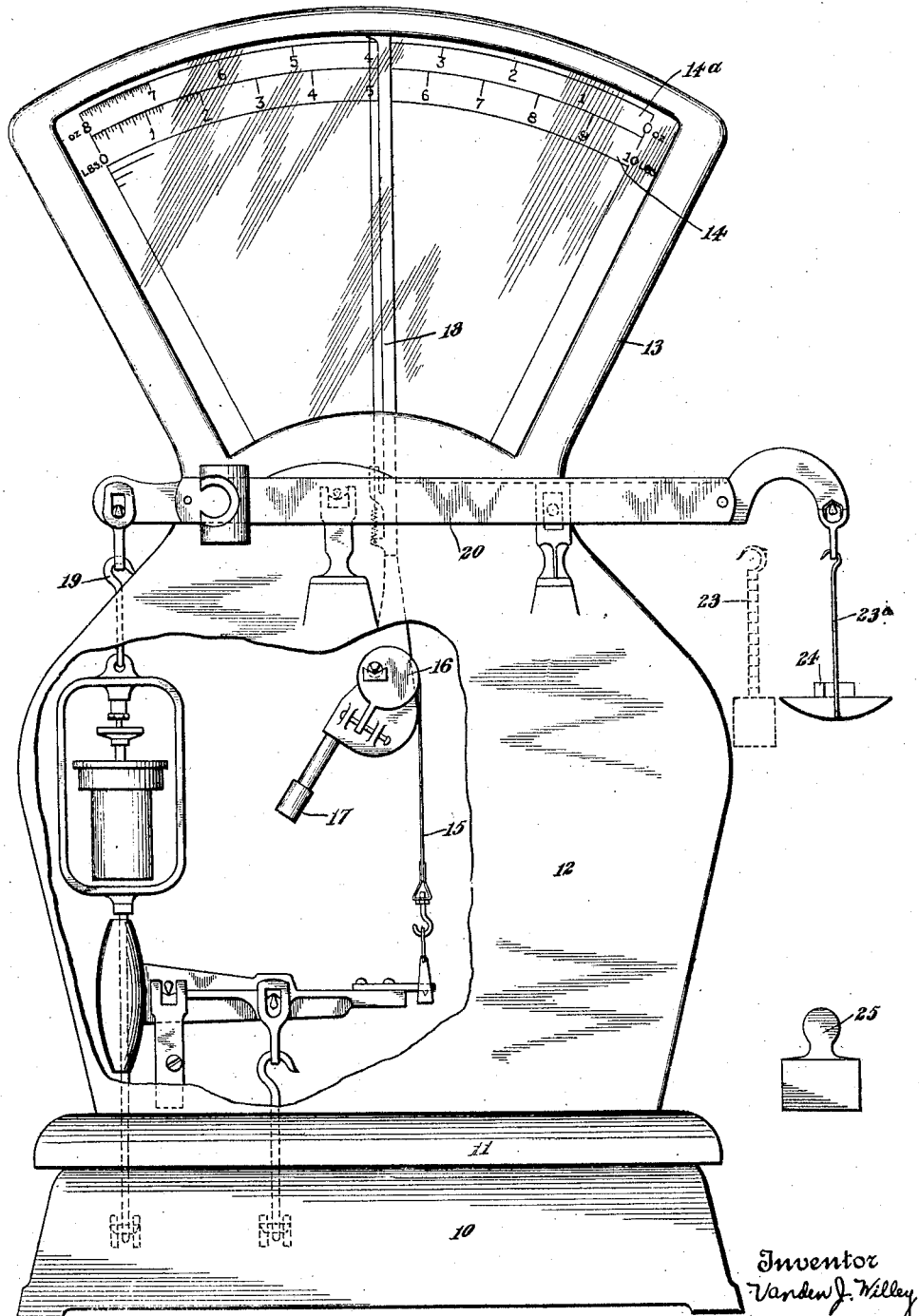
Inventor
Vanden J. Willey
By his Attorneys
Cooper, Kerr & Dunham Patented Nov. 18, 1924.

1,516,033

UNITED STATES PATENT OFFICE.

VANDEN J. WILLEY, OF MEMPHIS, TENNESSEE, ASSIGNOR TO DAYTON SCALE COMPANY, OF DAYTON, OHIO, A CORPORATION OF NEW JERSEY.

SCALE.

Application filed February 6, 1923. Serial No. 617,240.

*To all whom it may concern:*

Be it known that I, VANDEN J. WILLEY, a citizen of the United States, residing at Memphis, in the county of Shelby and State of Tennessee, have invented certain new and useful Improvements in Scales, of which the following is a full, clear, and exact description.

This invention relates to improvements in scales and has for its object the provision of a scale of the automatic type which may be readily converted from a scale having a considerable range of weighing capacity to a so-called fine weighing scale of comparatively limited range, which is more suitable for the weighing of very light articles.

The drawings show a scale which illustrates a preferred embodiment of my invention.

The main structural features of the scale are common and well known in the art, being fully described and shown in the patent to Hopkinson and Ozias, No. 867,671, to which reference may be made for a complete description. Briefly, the scale comprises a base 10 having a platform 11, a pedestal 12 surmounted by a chart housing 13 which has the usual fan-shaped computing and weight chart 14. The computing graduations, being well known, are not shown on the chart but are of the usual form, disposed below the main weight graduations 14. The lever system in the base of the scale, through an intermediate lever, connects with a tape 15 which cooperates with the usual segment 16 carrying pendulum 17 and also carrying an indicating hand or indicator 18, of the usual form. A steelyard 19 extends from the base lever system and connects with the main scale lever 20. Beam 20 carries the usual sliding tare poise, and for normal weighing operations is provided with a pendent weight 23 shown detached in the drawings. When the pendent weight is in position with no load upon the platform 11 the indicator 18 will stand at zero on the chart 14, and swing to the right as additional loads are applied to the platform. For normal weighing operations the "automatic capacity" of the scale is here shown as 10 pounds. Further capacity may be secured by the application of suitable weights to the pendent 23.

In order to convert the scale just described into a fine weighing scale, weight pendent 23 is removed and replaced with an article carrier 23ª. The weight of this article carrier 23ª is such that the indicator 18, in place of standing at zero on the chart 14, will stand at the last graduation on this chart, i. e., 10 pounds. For fine weighing a supplemental chart 14ª is provided, preferably directly above the chart 14 and having its indications running in reverse direction. This chart is here shown as graduated in ounces, with an 8-ounce total capacity.

After the supplementary article carrier has been placed in position, the article to be weighed, marked 24 in the drawings, is placed on the article carrier, thereby causing pivotal indicator 18 to swing counterclockwise and indicate on the graduated scale 14ª the exact weight of the article.

Should it be desired to weigh articles which are of comparatively light weight but over the capacity of the chart 14ª, a weight 25 which corresponds in weight to the capacity of the chart 14 is applied to the platform 11. In this way the indicator 18 will be restored to the right and the resulting indication on chart 14ª, added to the capacity of this chart, will give the true weight of the article. In explanation it may be stated that if the weight 25 be of 10 pounds and placed on the platform 11, and it be desired to ascertain the weight of the article 24, this article would weigh exactly 12 ounces, since the capacity of chart 14ª is 8 ounces and the pointer 18 stands over 4 ounces.

The scale just described therefore may be readily adapted for fine or coarse weighing by simple substitution of the pendent weight 23 and the article carrier 23ª.

What I claim is—

1. A weighing scale of the automatic type having a beam, a detachable weight receiver thereon, an indicator and a weighing chart, an article receiver adapted to replace the weight receiver and having a different weight therefrom to cause the indicator to be displaced to a different position over the chart, and a supplementary chart having the graduations reversely arranged to those of the main chart and having its zero graduation aligned with the position assumed by the indicator when the article receiver is applied to the beam.

2. In an automatic weighing scale provided with a beam carrying the usual weight receiver and having an indicator and a co-operating chart, in combination, a supplementary chart having its graduations and indications reversely arranged with respect to the main chart, and an article receiver adapted to replace the weight receiver and by a difference in weight relatively thereto cause the indicator to assume a position away from normal zero and in alignment with the zero of the supplemental chart.

In testimony whereof I hereto affix my signature.

VANDEN J. WILLEY.